US012169274B2

(12) United States Patent
Carmody et al.

(10) Patent No.: US 12,169,274 B2
(45) Date of Patent: Dec. 17, 2024

(54) METHOD AND APPARATUS FOR MOVING A FIBRE TIP

(71) Applicant: The Commonwealth of Australia, Victoria (AU)

(72) Inventors: Neil Carmody, Victoria (AU); Alexander Hemming, Victoria (AU)

(73) Assignee: THE COMMONWEALTH OF AUSTRALIA AS REPRESENTED BY THE DEFENCE SCIENCE & TECHNOLOGY GROUP, DEPARTMENT OF DEFENCE, Victoria (AU)

( * ) Notice: Subject to any disclaimer, the term of this patent is extended or adjusted under 35 U.S.C. 154(b) by 0 days.

(21) Appl. No.: 18/007,685

(22) PCT Filed: May 13, 2021

(86) PCT No.: PCT/AU2021/050451
§ 371 (c)(1),
(2) Date: Dec. 1, 2022

(87) PCT Pub. No.: WO2021/243397
PCT Pub. Date: Dec. 9, 2021

(65) Prior Publication Data
US 2023/0213753 A1  Jul. 6, 2023

(30) Foreign Application Priority Data
Jun. 2, 2020  (AU) .................. 2020901809

(51) Int. Cl.
*G02B 6/26* (2006.01)
*G02B 6/32* (2006.01)
(Continued)

(52) U.S. Cl.
CPC .................. *G02B 26/103* (2013.01)

(58) Field of Classification Search
CPC .. G02B 26/103; G02B 6/3616; G02B 6/4226; G02B 6/3578; G02B 6/02; G02B 6/3504
(Continued)

(56) References Cited

U.S. PATENT DOCUMENTS

| 4,543,663 A | 9/1985 | Laor |
| 5,704,898 A | 1/1998 | Kokish |

(Continued)

FOREIGN PATENT DOCUMENTS

| EP | 1142529 A1 | 10/2001 |
| WO | 2018222595 | 12/2018 |

(Continued)

OTHER PUBLICATIONS

International Searching Authority, "International Search Report," issued in connection with International Application No. PCT/AU2021/050451, mailed on May 28, 2021, 9 pages.
(Continued)

*Primary Examiner* — Charlie Y Peng
(74) *Attorney, Agent, or Firm* — Hanley, Flight & Zimmerman, LLC

(57) ABSTRACT

Described herein is a fibre positioning system (100) for positioning a tip (102) of an optical fibre (104). The system (100) includes a piezoelectric tube scanner (106) disposed along an optical axis (107). The piezoelectric tube scanner (106) has a first end (114) fixedly mounted with respect to a mounting structure (116), a hollow interior (118) for receiving the length of the optical fibre (104) and a second end (120) being freely able to bend in a lateral direction perpendicular to the optical axis (107) in response to one or more first actuation signals from a controller (122). A glass end cap (124) is fixedly mounted at the second end (120) of the piezoelectric tube scanner (106) and optically spliced to the tip (102) of the optical fibre (104) such that bending of
(Continued)

the piezoelectric tube scanner (106) results in lateral movement of the tip (102) of the optical fibre (104) with respect to the optical axis (107).

14 Claims, 11 Drawing Sheets

(51) Int. Cl.
  *G02B 6/42* (2006.01)
  *G02B 26/10* (2006.01)
(58) Field of Classification Search
  USPC ... 385/25, 34–37, 49–50, 65, 66, 68, 83, 84, 385/129–132
  See application file for complete search history.

(56) References Cited

U.S. PATENT DOCUMENTS

| | | | | |
|---|---|---|---|---|
| 7,129,472 | B1* | 10/2006 | Okawa | A61B 1/00165 359/201.1 |
| 8,503,837 | B2 | 8/2013 | Beresnev et al. | |
| 8,705,184 | B2* | 4/2014 | Xu | G02B 23/243 359/736 |
| 9,036,140 | B2* | 5/2015 | Mihajlovic | G02B 26/103 356/497 |
| 9,215,969 | B2* | 12/2015 | Sakai | A61B 1/00057 |
| 11,717,147 | B2* | 8/2023 | Hsu | A61B 34/71 600/135 |
| 2001/0017956 | A1 | 8/2001 | Goodman et al. | |
| 2003/0063838 | A1 | 4/2003 | Hagood et al. | |
| 2004/0042716 | A1* | 3/2004 | Dames | G02B 6/32 385/31 |
| 2012/0140301 | A1 | 6/2012 | Xu et al. | |
| 2014/0178861 | A1 | 6/2014 | Duer | |
| 2015/0268415 | A1* | 9/2015 | Schowengerdt | G02F 1/335 385/119 |

FOREIGN PATENT DOCUMENTS

| | | |
|---|---|---|
| WO | 2018222727 | 12/2018 |
| WO | WO-2018222727 A1 * | 12/2018 |
| WO | 2019078058 A1 | 4/2019 |

OTHER PUBLICATIONS

International Searching Authority, "Written Opinion," issued in connection with International Application No. PCT/AU2021/050451, mailed on May 28, 2021, 3 pages.

European Patent Office, "Extended European Search Report," issued in connection with European Patent Application No. 21816635.3, dated May 17, 2024, 11 pages.

Chen et al., "Analysis and Comparison of the Displacement Amplifiers with a Generalized Mathematical Model," Proceedings of 9th IEEE International Conference on Cyber Technology in Automation, Control, and Intelligent Systems, Jul. 29-Aug. 2, 2019, 6 pages.

* cited by examiner

METHOD AND APPARATUS FOR MOVING A FIBRE TIP

RELATED APPLICATIONS

This patent arises from the U.S. national stage of International Patent Application Serial No. PCT/AU2021/050451, having an international filing date of May 13, 2021, which is hereby incorporated by reference in its entirety. Further, this patent claims priority to Australian Patent Application No. 2020901809, which was filed on Jun. 2, 2020.

FIELD OF THE INVENTION

The present application relates to optical fibre positioning systems and in particular to optical fibre tip direction control.

Embodiments of the present invention are particularly adapted for controlling the position and direction of a fibre tip in a laser source or fibre amplifier. However, it will be appreciated that the invention is applicable in broader contexts and other applications.

BACKGROUND

Applications, such as optical telecommunications, requiring accurate pointing of laser sources over greater atmospheric distances suffer deleterious effects to the beam quality caused by turbulence within the propagation atmosphere column, mechanical vibration at the transmitter and rapid movement of the target.

Such beam pointing errors can be partially compensated for by steering the beam in a direction counter to the induced error and at a sufficient rate. However, pointing rate and accuracy is limited by the inertia and step resolution of the mechanical hardware systems typically employed for this problem. This limitation also results in a reduced pointing accuracy for point selection of targets at long ranges, limiting these systems to short range applications.

Piezo bender-based solutions have been proposed. However, these systems will likely suffer lifetime degradation to the fibre due to frictional abrasion between the fibre and the flexible beams connecting the benders to the fibres. Many piezo benders have slow deformation rates making them unsuitable for atmospheric compensation.

For high power applications, it is also important that any back-propagating light (from surface reflections) is not allowed back into the fibre itself.

Entities endeavouring to develop directed energy technologies may require some method of high fidelity beam pointing beyond that found in commercially available pan tilt units and gimbals. Although some astronomical gimbals have such resolution, they are not designed to move rapidly and may not be suitable for high power directed energy applications.

U.S. Pat. No. 4,543,663 to Herzl Laor, entitled Piezoelectric apparatus for positioning optical fibers" (hereinafter "Laor") describes a system which is capable of moving a fibre tip in three dimensions. Laor relies on one dimensional piezo benders and cascades further modules, rotated 90 degrees to the end of a former module to achieve multi-dimensional movement. This system may not be compact, nor will it display rapid spatial bandwidth since the earlier stages are suffering significant bandwidth losses due to the inertial build-up from the extra mass of each added stage. Further, Laor teaches gluing or mechanical attachment of the fibre to the bender so that the fibre is physically touched. This will likely have implications for high power applications such as fibre lasers operating in the kW power range.

Any discussion of the background art throughout the specification should in no way be considered as an admission that such art is widely known or forms part of common general knowledge in the field.

SUMMARY OF THE INVENTION

In accordance with a first aspect of the present invention, there is provided a fibre positioning system for positioning a tip of an optical fibre, the system including:
  a piezoelectric tube scanner disposed along an optical axis, the piezoelectric tube scanner having:
    a first end fixedly mounted with respect to a mounting structure;
    a hollow interior for receiving a length of the optical fibre; and
    a second end being able to bend in a lateral direction perpendicular to the optical axis in response to one or more first actuation signals from a controller; and
    a glass end cap fixedly mounted at the second end of the piezoelectric tube scanner and optically spliced to the tip of the optical fibre such that bending of the piezoelectric tube scanner results in lateral movement of the tip of the optical fibre with respect to the optical axis.

In some embodiments, the system includes a linear actuator configured to linearly move the piezoelectric tube scanner and length of optical fibre in a direction along the optical axis in response to a second actuation signal from the controller. The linear actuator is preferably fixedly mounted to the mounting structure. The linear actuator preferably forms part of the mounting structure. In some embodiments, the linear actuator is a displacement amplifier.

In some embodiments, one side of the displacement amplifier engages the first end of the piezoelectric tube scanner or mounting structure and an opposing side of the displacement amplifier engages a rigid surface of a separate structure.

In some embodiments, the end cap is spliced to the tip of the optical fibre at a perpendicular angle relative to the optical axis.

In some embodiments, the length of optical fibre forms part of an optical source.

In some embodiments, the glass end cap is mounted to a fitting which is fixedly mounted within the piezoelectric tube scanner at the second end.

In some embodiments, the length of optical fibre is maintained within the piezoelectric tube scanner at a position such that the optical fibre does not contact an inner surface of the tube scanner during operation. Preferably the length of optical fibre is mounted in a strain relief unit that is attached to the mounting structure. Preferably at least a portion of the length of optical fibre has its sheath stripped.

In some embodiments, the end cap is substantially in line with the second end of the piezoelectric tube scanner along the optical axis.

In some embodiments, a spatial step resolution of the fibre positioning in the lateral dimension is less than 1 micrometre.

In other embodiments, the piezoelectric tube scanner is bendable such that a lateral range of motion of the tip of the optical fibre is greater than 10% of a mode field diameter of an output beam produced by the optical source, wherein the mode filed diameter is measured at an output of the optical source. In some embodiments, the piezoelectric tube scanner is bendable such that a lateral range of motion of the tip of the optical fibre is greater than a mode field diameter of an output beam produced by the optical source, wherein the mode field diameter is measured at an output of the optical source.

In some embodiments, the lateral range of motion of the tip of the optical fibre is greater than 100 micrometres.

In some embodiments, the piezoelectric tube scanner is responsive to the one or more first actuation signals from the controller to laterally displace the fibre tip at a frequency greater than 100 Hz.

In accordance with a second aspect of the present invention, there is provided a positioning system including a plurality of fibre positioning systems according to the first aspect. In some embodiments, the plurality of fibre positioning systems is disposed in a predefined two-dimensional or three dimensional array.

In accordance with a third aspect of the present invention, there is provided an optical fibre system including:
- a length of optical fibre supporting the propagation of optical energy to produce a laser output from a tip of the length of optical fibre;
- a fibre positioning system according to the first aspect to position the tip of the length of optical fibre in at least two dimensions to direct the laser output in a predetermined direction;
- an optical system for receiving the laser output and generating an output optical beam propagating along a predetermined trajectory.

In some embodiments, the optical system includes an optical power element for performing focussing or collimation of the output optical beam. Preferably the optical power element is fixed in position relative to the fibre positioning system.

In some embodiments, the system is configured to support optical radiation having an optical power of at least 100 W.

In some embodiments, the length of optical fibre forms part of a fibre laser. In other embodiments, the length of optical fibre forms part of a fibre amplifier.

In some embodiments, the system includes a plurality of optical fibres and fibre positioning systems, wherein each optical fibre system is configured to produce a respective output optical beam. This system may include a beam combiner configured to combine the output optical beams into a combined output beam. In some embodiments, at least a subset of the output optical beams have a different centre frequency. In some embodiments, the beam combiner includes a dispersive optical element and coupling optics for coupling each of the output optical beams to the diffractive optical element to produce a combined output beam. In some embodiments, the beam combiner includes one or more of a diffraction grating, prism, volume Bragg grating, dichroic mirror and/or multi-layer dielectric grating.

In some embodiments, at least a subset of the output optical beams have a common centre frequency. In some embodiments, the beam combiner includes one or more of a tiled array, polarisation combining elements, diffractive optical element and/or a beam splitter tree.

BRIEF DESCRIPTION OF THE FIGURES

Example embodiments of the disclosure will now be described, by way of example only, with reference to the accompanying drawings in which.

DESCRIPTION OF THE INVENTION

The present invention will be described herein with reference to positioning a tip of a fibre.

System Overview

Figure 1:
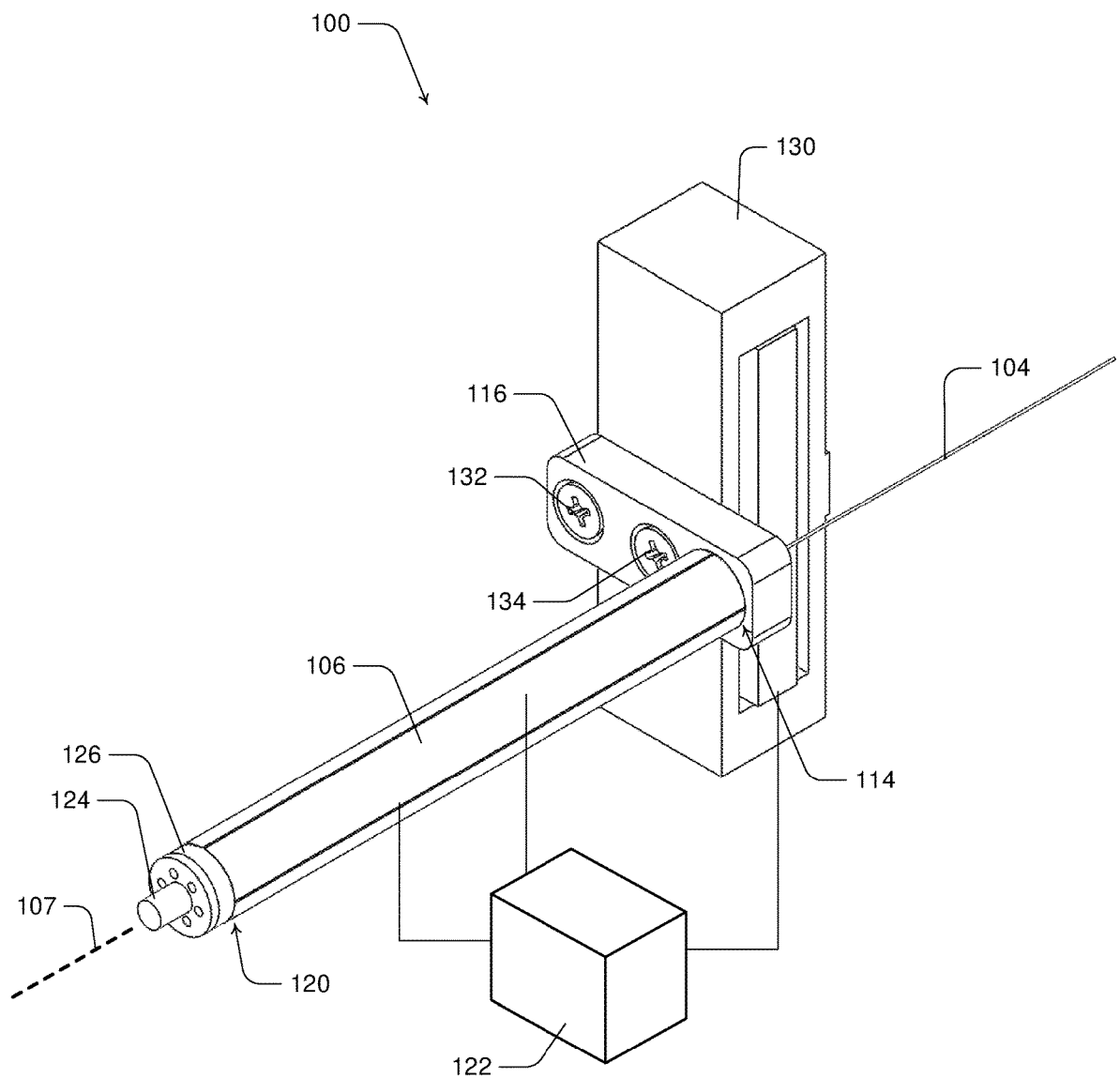
FIG. 1 is a side elevated perspective view of a fibre positioning system.
Figure 2:
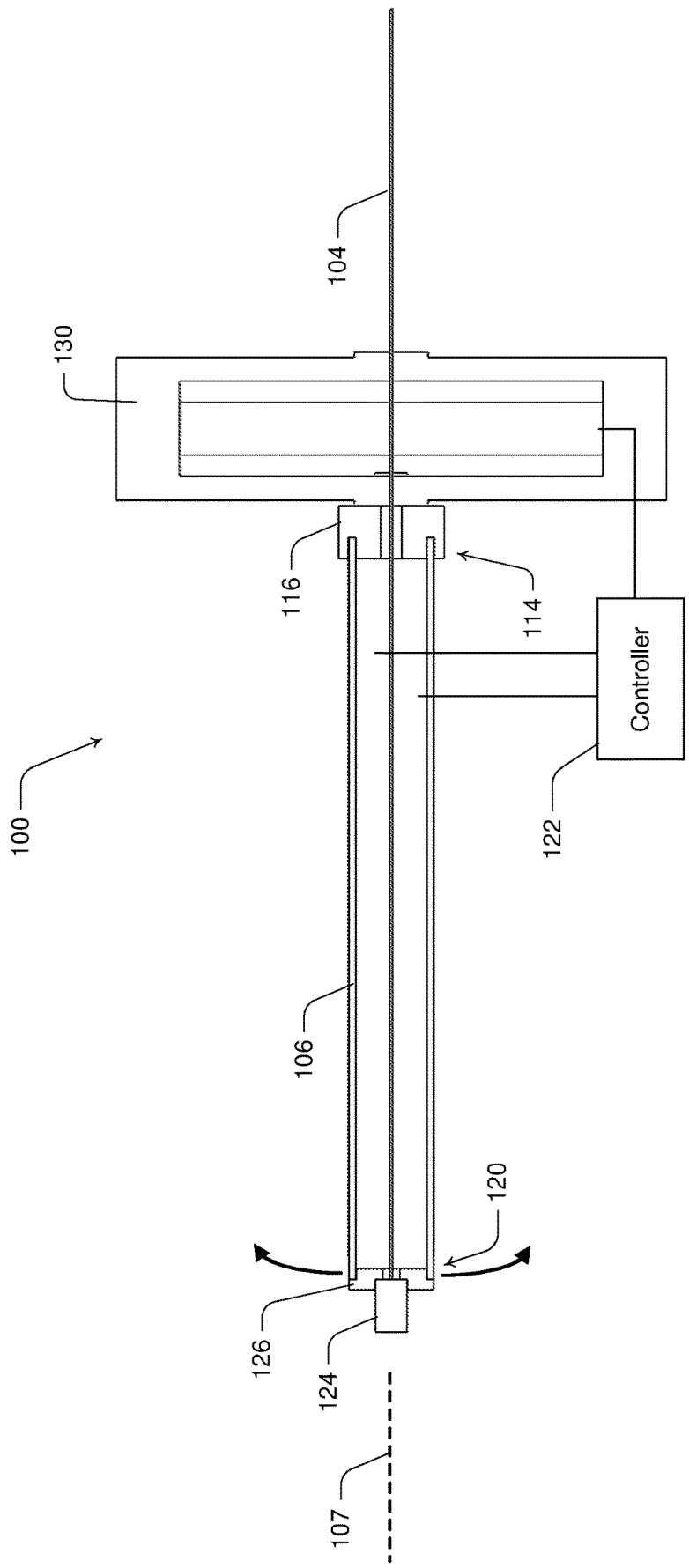
FIG. 2 is a side view of the fibre positioning system of FIG. 1.

Referring initially to FIGS. 1 and 2, there is illustrated a fibre positioning system 100 for positioning a tip 102 of an optical fibre 104 in two or three dimensions. In the embodiments described herein, optical fibre 104 forms part of or delivers optical power from an optical source such as a fibre laser or fibre amplifier (not shown). However, it will be appreciated that the fibre positioning system 100 is applicable for broader uses such as fibre positioning in telecommunications applications like optical switches. As such, optical fibre 104 may represent any conventional single or multi-mode optical fibre.

Optical fibre positioning system 100 includes a piezoelectric tube scanner 106 disposed along an optical axis 107 that is defined generally by the axis of optical fibre 104. Although illustrated as being horizontal, it will be appreciated that optical axis 107 may extend in any orientation. Tube scanner 106 is generally cylindrical in cross section with a diameter of about 5-10 mm and a length in the range of 20 mm to 100 mm. By way of example, suitable tube scanners for the present application include the TB3507 or TB6006 models sold by PiezoDrive Pty Ltd. Other commercially available devices are suitable for the present invention.

Figure 3:
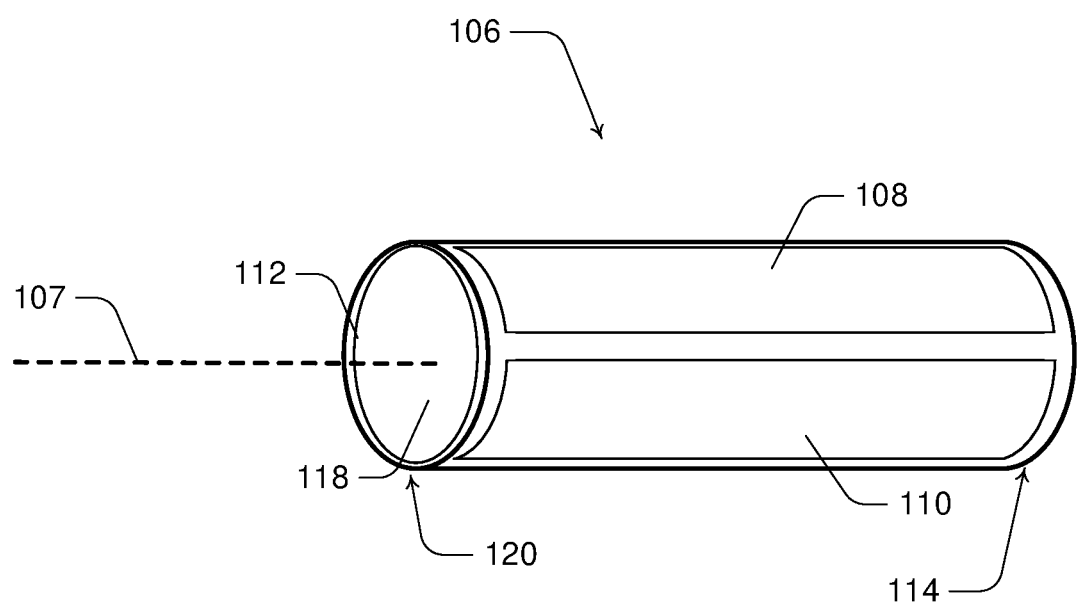
FIG. 3 is a side view of a piezoelectric tube scanner device.

Referring now to FIG. 3, piezoelectric tube scanner 106 is formed of a radially poled piezoelectric material with four external electrodes (e.g. 108, 110) and a solid or quadrant internal electrode 112. When a voltage is applied to one of the external electrodes, the tube wall expands which causes a vertical contraction and a large lateral deflection of the tube tip relative to the other end. This results in the tube bending in a predefined direction relative to optical axis 107. By way of example, tip deflections in the order of around 40

µm are possible for tube of length 35 mm and deflections of around 115 µm for a tube length of 60 mm.

Tube scanner 106 has a first end 114 fixedly mounted with respect to a mounting structure 116 (see FIG. 1) described below. Tube scanner also includes a hollow interior 118 that is defined by an internal surface of internal electrode 112 for receiving the length of optical fibre 104. A second end 120 of tube scanner 106 defines the tube tip and is freely able to bend in a radial direction (as indicated by the arrows in FIG. 2) perpendicular to the optical axis in response to one or more first actuation signals from a controller 122.

Figure 4:
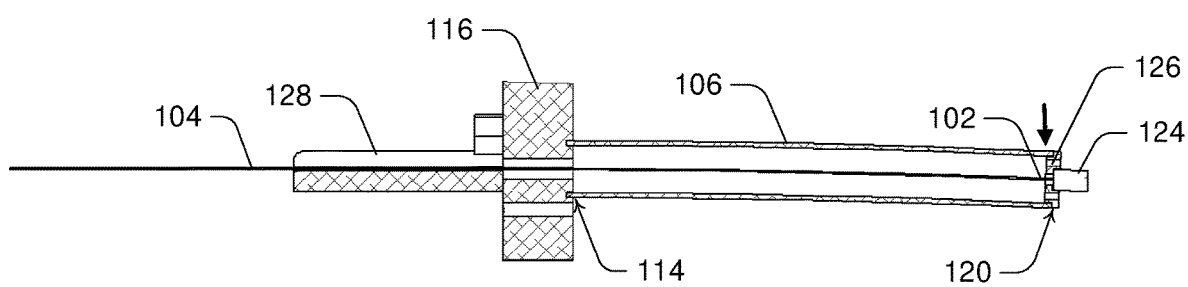
FIG. 4 is a side view of the fibre positioning system of FIGS. 1 and 2 in operation in which the piezoelectric tube scanner is in a downward deflected configuration.

FIG. 4 illustrates tube scanner 106 in a deformed state being bent downwards. Controller 122 may be any processor device capable of delivering voltage signals to the electrodes of tube scanner 106. In some embodiments, controller 122 is a dedicated hardware device while, in other embodiments, controller 122 includes a standard personal computer device in combination with basic control componentry such as a voltage amplifier or transformer. Where controller 122 is a dedicated hardware device, this basic control componentry may be integrated within the hardware device or located separate to the device. By way of example, some types of tube scanners require a ±250 V signal to achieve full deflection. This requires a dedicated voltage amplifier to produce the required voltage signal. Controller 122 and tube scanner 106 are connected by conventional electrical leads to predetermined terminals of the respective electrodes.

Referring again to FIG. 1, for high powered fibre laser steering applications (described below), it is preferable that tube scanner 106 is capable of moving tip 102 to achieve a desired angular range of motion after an output lens (described below). Furthermore, tube scanner 106 is preferably responsive to the one or more first actuation signals from controller 122 to bend at a frequency greater than 500 Hz. By way of example, a system with a 20 µm initial mode field diameter at the fibre, a 60 mm tube with a 115 µm deflection and a 550 mm focal length collimating lens would experience a full range beam steering of around 200 µrad. However, it is also preferable that tube scanner 106 has a sufficiently wide frequency response bandwidth so as to cover high speed steering to adapt to atmospheric turbulence and slow speed steering to adapt to thermal cycling and mechanical misalignments. As such, tube scanner 106 preferably has a frequency response bandwidth in the range of mHz to kHz.

While the bending of tube scanner 106 is an angular movement, the significantly small size of the angles means that any axial displacement of tip 102 during bending can be largely ignored as the lateral displacement of the tip dominates. As such, for practical purposes, a bending of tube scanner 106 is considered to give rise to only a lateral displacement of tip 102 with respect to the optical axis 107. This lateral displacement is subsequently converted into angular steering using appropriate optics described below.

As best shown in FIGS. 1 and 2, a glass end cap 124 is fixedly mounted at second end 120 of piezoelectric tube scanner 106 and optically spliced to tip 102 of optical fibre 104. In a suitable form, end cap 124 is spliced to tip 102 of optical fibre 104 and includes an anti-reflection (AR) coating to reduce back-reflections of light propagating back into optical fibre 104. To further reduce back reflections, end cap 124 is preferably formed of a glass having a substantially similar refractive index to that of the core of optical fibre 104. In some embodiments, back reflections may further be reduced by cleaving and splicing optical fibre 104 to end cap 124 using an angled cleave that is non-perpendicular to the optical axis. This is preferable in embodiments where the end cap 124 is formed of a material having a different refractive index to that of the core of optical fibre 104. In some embodiments the end-cap has an angled surface to reduce the reflections into the fibre. In some endcaps, a length of core-less fibre may be introduced to prevent or reduce mode distortion and induced wavefront error.

Glass end cap 124 is mounted to a substantially disk-shaped fitting 126, which is fixedly mounted within tube scanner 106 at second end 120. Fitting 126 may be formed of a metal, ceramic, graphic, glass or any such rigid material such as rigid plastics. In alternative embodiments, end cap 124 has a diameter substantially equal to an inner diameter of tube scanner 106 and end cap is directly mounted within the second end 120 of tube scanner 106 without a need for fitting 126. However, it will be appreciated that end cap 124 generally only needs to be of sufficient size to accept the output light from the fibre, and matching the divergence of the fibre. As such, the length and width of end cap 124 may be dictated by the chosen fibre and optionally other physical constraints of the particular system.

End cap 124 preferably has a diameter greater than that of optical fibre 104 but equal to or less than the diameter of tube scanner 106. Although end cap 124 is illustrated as being cylindrical in diameter, it will be appreciated that, in other embodiments, end cap 124 may be of other shapes and other sizes. End cap 124 is advantageous for high power applications where the output optical power from tip 102 of optical fibre 104 is greater than 100 W or where the amplifiers are operating at high optical gain and sufficient suppression of feedback is required.

In the operative position, fibre tip 102 and end cap 124 are positioned at or very close to end 120 of tube scanner 106. This positioning allows bending of the piezoelectric tube scanner to result in lateral spatial movement of fibre tip 102 of optical fibre 104 relative to optical axis 107, as illustrated in FIG. 4. This lateral movement results in angular movement of the output beam when system 100 is coupled with an optical system described below. Thus, the spatial movement of tip 102 is highly correlated with the deformation of tube scanner 106 and the output beam angle is then highly deterministic from a control point of view.

The fibre tip 102 will have maximum range of lateral displacement when it is positioned directly in line (flush) with the end 120 of tube scanner 106. Protruding fibre tip 102 further beyond end 120 will increase the range of lateral motion of tip 102 at the expense of increased mass and thus reduced bandwidth if not operating in a resonant mode. Thus, although making fibre tip 102 flush with end 120 of tube scanner is preferable, it will be appreciated that mechanical assembly limitations may dictate a small deviation from ideal.

Referring still to FIG. 4, the length of optical fibre 104 may be mounted in a strain relief unit 128 that is attached to mounting structure 116. Strain relief unit 128 maintains optical fibre 104 in a fixed position with a small degree of slack to permit length changes due to fibre bending. As illustrated in FIGS. 1, 2 and 4, the length of optical fibre 104 is maintained within tube scanner 106 at a position such that, under its own rigidity, the optical fibre does not contact an inner surface of the tube scanner during operation (either while straight or under bending). The contactless system provides robustness and extended lifetime to a fibre laser by avoiding friction damage and avoiding power density on a clamped section of fibre or end cap.

In some embodiments, a portion of optical fibre 104 that extends within tube scanner 106 has its sheath stripped so that its cladding is exposed. This sheath removal is advantageous for performing cleaving of fibre 104 for splicing the fibre to end cap 124. The stripped section of fibre may extend back about 100 mm from end 114 of tube scanner 106 to near strain relief unit 128. However, the strain relief unit 128 should be located behind the stripped section such that it engages with the sheath.

As best shown in FIGS. 1 and 2, system 100 also includes a linear actuator in the form of a displacement amplifier 130. Displacement amplifier 130 is configured to linearly move the tube scanner 106 and optical fibre 104 together in a direction along optical axis 107 in response to a second actuation signal from controller 122. Although illustrated as a displacement amplifier, it will be appreciated that various other forms of linear actuator may be implemented in the present invention. By way of example, other suitable linear actuators may include lead screw, rack and pinion or other types of linear stage, hexapods or voice coils, in no order of preference.

Displacement amplifier 130 is fixedly mounted to a side of mounting structure 116 by way of screws 132 and 134. However, in other embodiments, displacement amplifier 130 may be mounted to mounting structure 116 by other means such as an adhesive or clamp. In some embodiments, the linear actuator forms part of the mounting structure, such as in an electromechanical mount.

Figure 5:
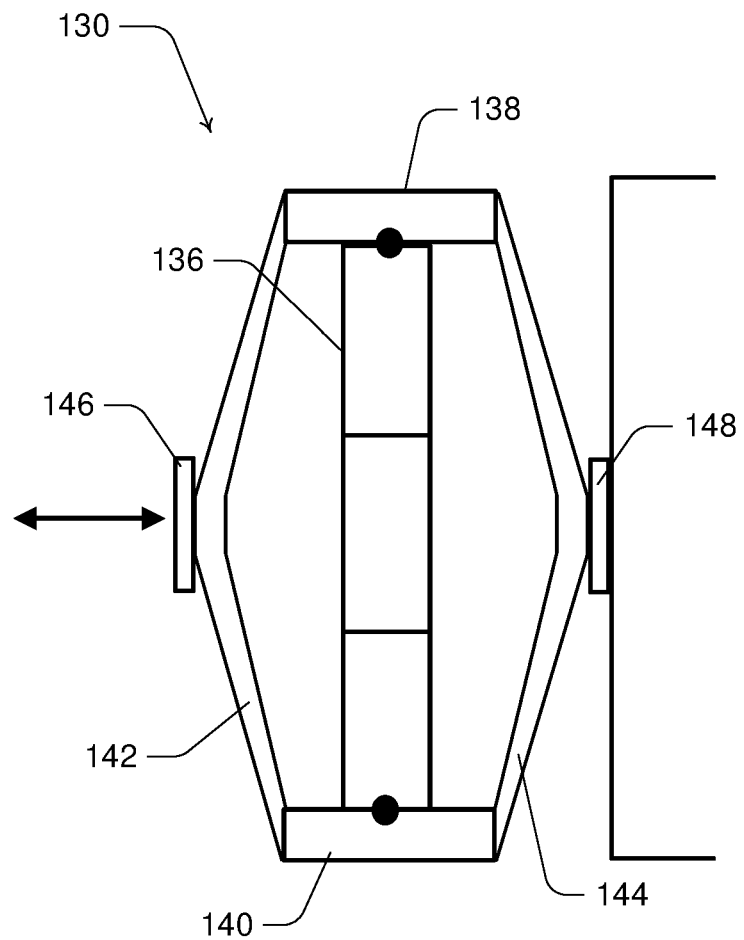
FIG. 5 is a schematic side illustration of a displacement amplifier device.

Displacement amplifier 130 is illustrated schematically in FIG. 5. Amplifier 130 includes a central actuator element 136 formed of a plurality of individual piezoelectric elements. In some embodiments, central actuator element 136 is formed of a single piezoelectric element. Element 136 is fixed at each end to respective connecting portions 138 and 140 of a dual-hinge flexure mechanism. Connecting portions 138 and 140 are hingedly connected to respective flexure arms 142 and 144 formed of a resilient material such as a metal.

Central actuator element 136 is electrically poled and connected to electrodes (not shown) for receiving the second actuation signal from controller 122. In response to the actuation signal, central actuator element 136 expands or contracts longitudinally (vertical direction in FIG. 5). This longitudinal movement urges connecting portions 138 and 140 further apart or closer together, which, in turn, act to stretch or contract flexure arms 142 and 144. Arms 142 and 144 are resiliently biased into an outward position such that longitudinal extension of central actuator element 136 acts to move flexure arms 142 and 144 inward towards element 136 against their bias. Flexure arms 142 and 144 include abutment formations 146 and 148 which are able to abut and mount to other surfaces to transfer the linear motion.

In operation, the second actuator signal produces linear movement along the optical axis 107 by transferring the (vertical) extension or contraction of the piezoelectric elements within central actuator element 136 to a (horizontal) linear motion via the dual-hinge flexure mechanism. The flexure mechanism provides amplification in the sense that a small change in dimensions of central actuator element 136 provides a larger movement along the optical axis 107. Although other linear actuators are possible in the present invention, the design of displacement amplifier 130 provide a very compact device for delivering a large range of motion, fast response time, and sub-nanometre resolution.

One abutment formation 146 of amplifier 130 is positioned to abut and mount to a side of mounting structure 116, as illustrated best in FIG. 1. In other embodiments, abutment surface 146 is configured to directly abut and mount to first end 114 of piezoelectric tube scanner 106. Opposing abutment formation 148 of amplifier 130 is fixedly mounted to a surface 150 of a separate fixed structure such as a mounting plate by way of screws or other fixing means. This mounting to a fixed structure acts as a fixed reference point from which displacement amplifier 130 provides controlled linear motion along optical axis 107.

Various displacement amplifiers are commercially available. However, a suitable displacement amplifier is the AP830 model device sold by PiezoDrive Pty Ltd, which can provide linear motion over a range of 830 µm. Preferably, displacement amplifier 130 should provide at least 200 µm of linear motion and have a bandwidth of greater than 100 Hz.

Although FIG. 1 illustrates tube scanner 106 mounted off-axis to displacement amplifier 130, tube scanner 106 may also be mounted in-line with displacement amplifier 130 to further reduce the spatial footprint of the invention. In the in-line arrangement, a hole is cut through displacement amplifier 130 for threading optical fibre 104 along optical axis 107.

In operation, controller 122 sends the first actuation signals to deflect tube scanner 106 to control the lateral spatial position of fibre tip 102 with respect to optical axis 107. Controller 122 also sends the second actuation signal to control displacement amplifier 130 to linearly move fibre tip 102 along optical axis 107. During this linear axial motion, each of the tube scanner 106, optical fibre tip 102 and end-cap 124 all move linearly in unison. Together, controller 122 is able to control the position and orientation of fibre tip 102 in three dimensions to direct an optical output of optical fibre 104. The control signals may be generated in response to a feedback system such as an object tracking system, intensity measurement sensor or the like.

Although described as separate signals, it will be appreciated that the first and second actuation signals may be generated by controller 122 as a single signal that is split, interpreted and/or actuated differently by tube scanner 106 and displacement amplifier 130.

Figure 6:
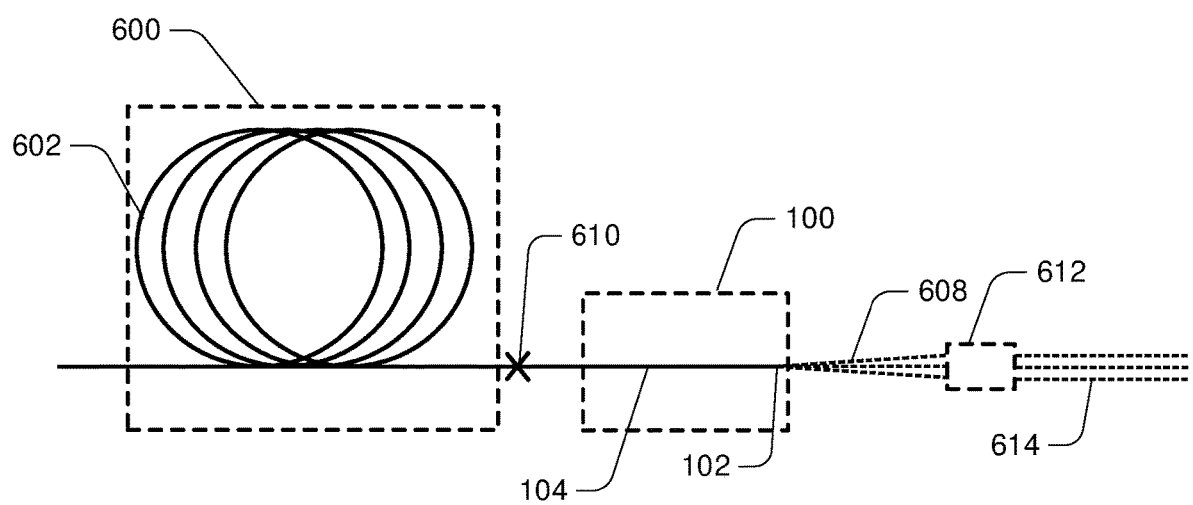
FIG. 6 is a schematic illustration of a fibre laser utilising a fibre positioning system.

As mentioned above, a primary application for system 100 is for directing an output beam of optical radiation from an optical source such as a fibre laser or fibre amplifier. Referring now to FIG. 6, there is illustrated a schematic of an optical source 600 which uses system 100 to control its output beam. Source 600 includes a length 602 of optical fibre that supports the propagation of optical energy to produce an output 608 from a tip of the optical fibre. Depending on the application, optical source 600 may (in the case of a fibre amplifier) be connected to a source of the optical energy or may itself generate the optical energy (in the case of a fibre laser) from a pump source or the like. In the illustrated embodiment, length 602 is spliced to optical fibre 104 at a splicing point 610. However, in other embodiments, length 602 and optical fibre 104 may be one and the same such that optical fibre 104 forms part of fibre laser 600 itself. In either case, laser output 608 is generated at tip 102.

Referring still to FIG. 6, optical source 600 includes an optical system 612 for receiving the laser output 608 and generating an output optical beam 614 propagating along a predetermined trajectory. Optical system 612 may include one or more optical power elements such as lenses, prisms, mirrors or lens arrays for performing focussing and/or collimation of output optical beam 614. At least one of the optical power elements representing the primary imaging optics is preferably fixed in position relative to the fibre positioning system such that movement of tip 102 by system 100 changes the focal position of optical beam 614. In particular, movement of tip 102 along the optical axis 107 by displacement amplifier 130 allows a spot size (diameter) of optical beam 614 at a target range to be controlled. In some applications, optical source 600 is configured to produce an optical output of at least 100 W. However, it will be appreciated that lower power applications are possible with the present invention.

In combination with optical source 600, system 100 is capable of moving tip 102 with a step resolution that results in movement of optical beam 614 by a distance smaller than a diameter of optical beam 614 at a target location. In some embodiments, system 100 provides for steering the optical beam 614 by an angular step resolution of less than 1 microradian at a target location. Tube scanner 106 is bendable such that a lateral range of motion of tip 102 can produce angular motion of optical beam 614 at a target location that is greater than a diameter of output beam 614.

Figure 7:
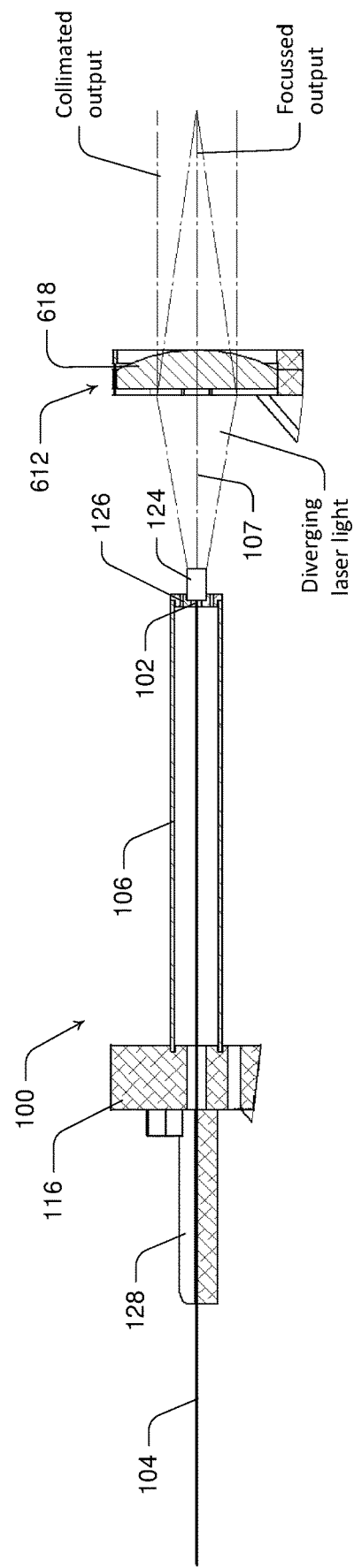
FIG. 7 is a schematic side view of the fibre positioning system of FIGS. 1, 2 and 4 showing output beam manipulation, wherein the tube scanner is in an undeflected configuration.
Figure 8:
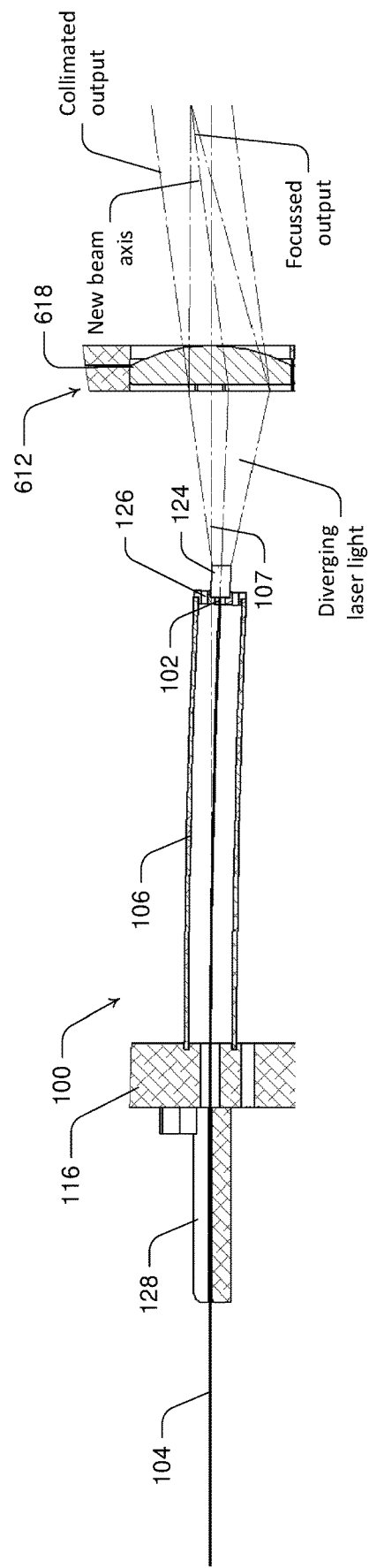
FIG. 8 is a schematic side view of the fibre positioning system of FIGS. 1, 2 and 4 showing output beam manipulation, wherein the tube scanner is in a downward deflected configuration.

Referring now to FIGS. 7 and 8, there is illustrated schematic side views of system 100 coupled with an optical system 612 comprising a lens 618 to illustrate the focussing and collimating effect of system 100. FIG. 7 illustrates system 100 in which tube scanner 106 is undeflected while FIG. 8 illustrates a scenario where tube scanner 106 is deflected downwards. Also shown are corresponding diverging optical fields from end cap 124 and focussed and collimated beams from lens 618. Switching between a collimating system and an imaging system is performed by moving system 100 closer or further from lens 618 via displacement amplifier 130.

Some example parameters and performance details of system 100 are included below.

Example 1

Piezoelectric tube scanner—TB3507 (PiezoDrive Pty Ltd):
  Tube Length=35 mm
  Displacement=39 μm
  Step Displacement@12 bit=9.5 nm
Typical Fibre Details:
  Wavelength=2 um
  Mode field Diameter=10 um
  Collimation Optic diameter=75 mm
  Range=1,000 m
  Beam Diameter at target=48.5 mm
  Maximum centroid movement at range=189.2 mm
Example 1: this tube scanner and optics is capable of steering an optical beam nearly 4 beam diameters at the target range. The nanometre step resolution allows correcting for lateral spatial errors that may occur due to thermal warping of other vibrations, over the full range of the piezo tube.

Example 2

Piezoelectric tube scanner TB6006 (PiezoDrive Pty Ltd):
  Tube Length=60 mm
  Displacement=110 μm
  Step Displacement@12 bit=26.7 nm
Typical Fibre Details:
  Wavelength=2 um
  Mode filed Diameter=10 um
  Collimation Optic diameter=75 mm
  Range=1,000 m
  Beam Diameter at target=48.5 mm
  Maximum centroid movement at range=552.9 mm
Example 2: this tube and optics is capable of steering nearly 12 beam diameters at the target range.

At a target range of 1,000 m, only 43 μm of travel along optical axis 107 is needed to move from a collimating system to an imaging system. At a target range of 100 m, 425 μm of travel along optical axis 107 is needed. At 12-bit resolution and 830 μm full scale deflection, this corresponds to 200 nm step resolution. That means at a target range of 1,000 m, around 200 steps of displacement are included within the 43 μm range of travel, thus providing fine resolution control.

Figure 9:
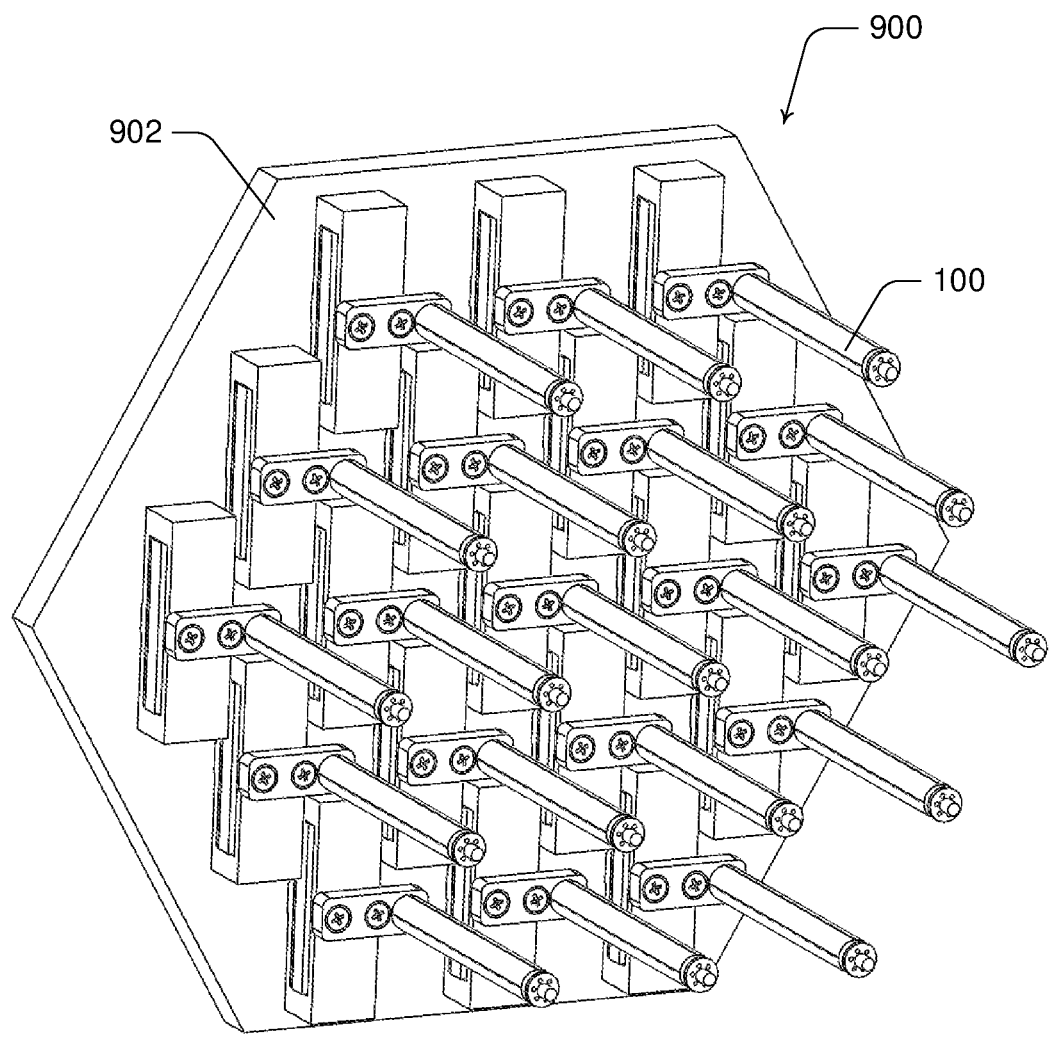
FIG. 9 is a perspective view of a system of fibre positioning systems disposed in a two dimensional array.
Figure 10:
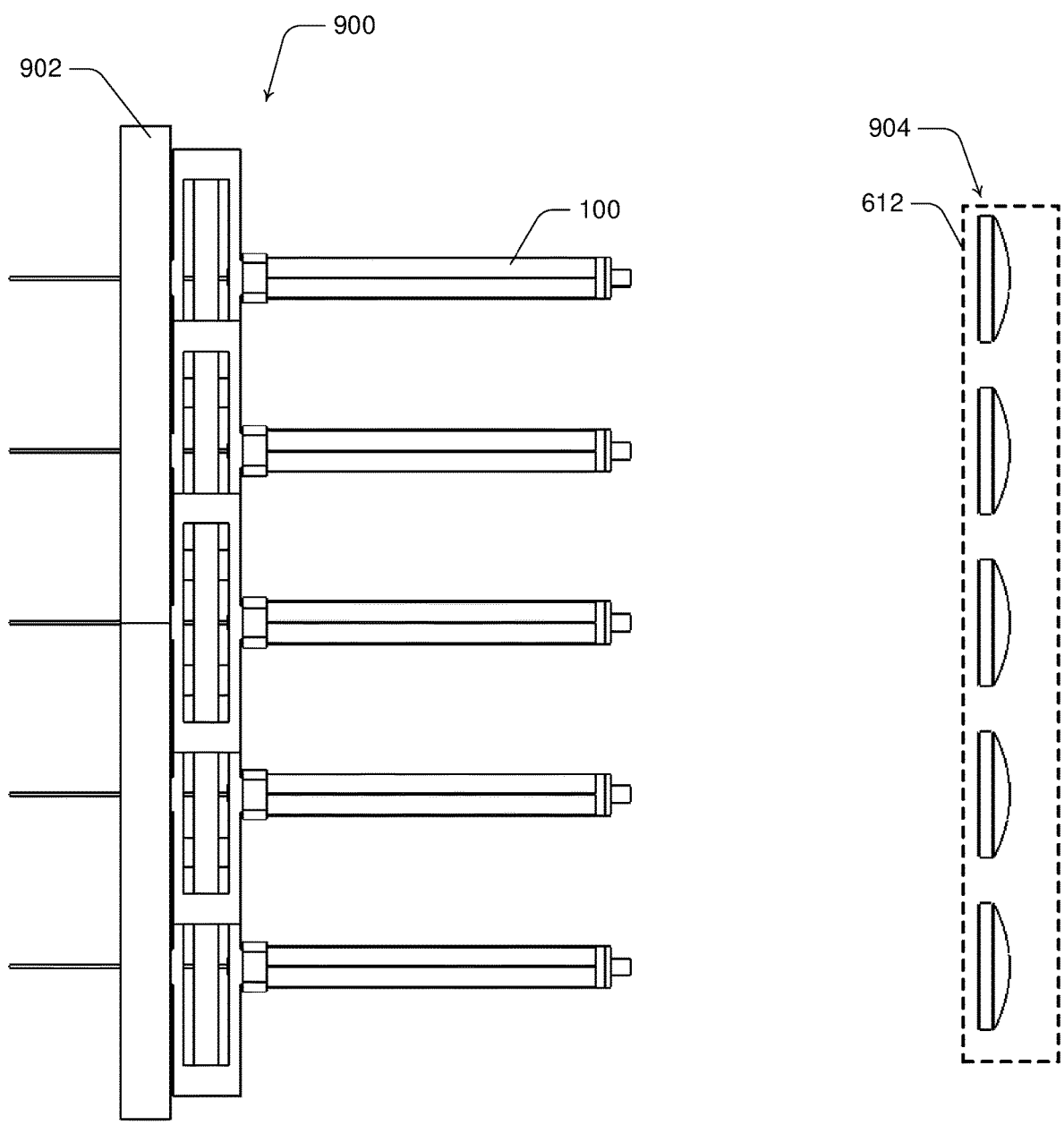
FIG. 10 is a side view of the system of FIG. 9 showing a corresponding array of lenses.

Referring now to FIGS. 9 and 10, there is illustrated a positioning system 900 including a plurality of fibre positioning systems 100 as described above. Each fibre positioning system 100 is configured to produce an optical output from a corresponding optical source (not shown) such as a fibre laser or fibre amplifier. Systems such as system 900 are useful for providing high powered laser outputs, often in the kilowatt range, by combining power from a number of individual fibre lasers or other amplified optical sources. In some embodiments, each of the fibre lasers share a common centre frequency while, in other embodiments, some or all of the output optical beams from the various fibre lasers have a different centre frequency (or wavelengths).

Each of the fibre positioning systems 100 are mounted at one side of displacement amplifier 130, on a base plate 902 and disposed in a predefined two-dimensional array across base plate 902. In some embodiments, base plate 902 is non-planar and fibre positioning systems 100 are disposed in a predefined three dimensional array. Positioning systems 100 in an array can reduce the overall system size and/or maximise the overall fill factor of the output apertures.

Referring to FIG. 10, a corresponding array 904 of lenses are positioned along respective optical axes of the fibre tips. Lens array 904 is configured to focus or collimate the optical output from each fibre tip to produce respective output optical beams. Lens array 904 forms part of optical system 612 as described above and the lenses are mounted to a common lens mounting (not shown).

To achieve a single output beam, the optical system 612 of system 900 includes a beam combiner, which may comprise one or more optical elements, configured to combine the output optical beams into a combined output beam. In embodiments wherein the optical sources produce different centre frequencies, the beam combiner can include one or more dispersive optical elements and coupling optics for coupling each beam onto the dispersive element.

Figure 11:
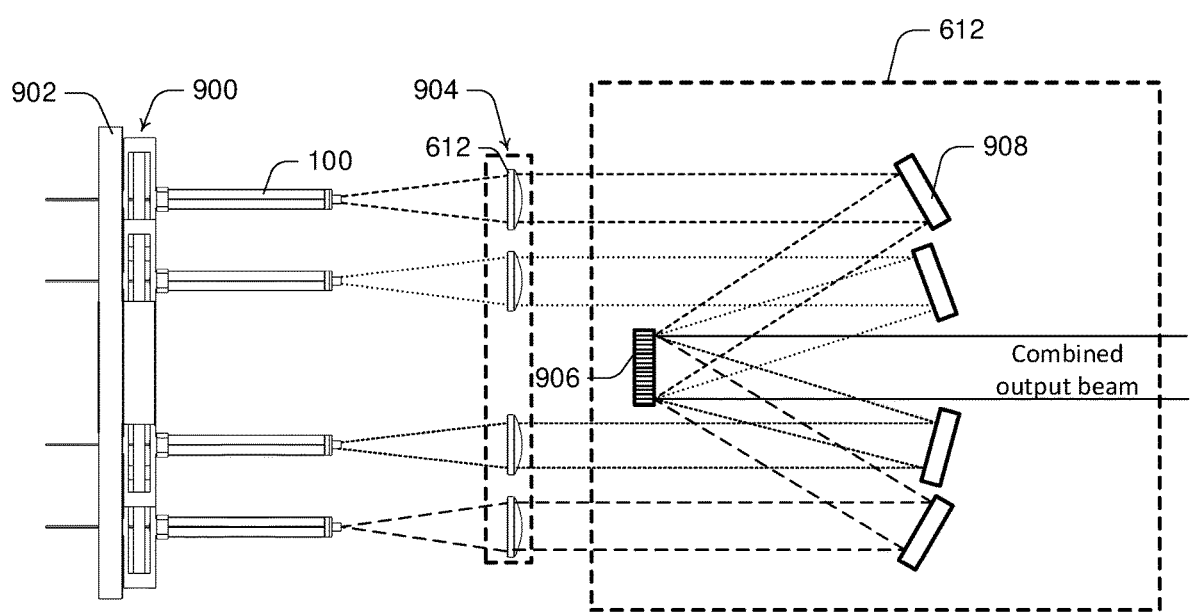
FIG. 11 is a schematic illustration of an exemplary optical system adopting a diffraction grating and steering optics for combining beams of different centre frequency into a combined output beam.

Referring to FIG. 11, the optical system 612 may include a beam combiner in the form of a diffraction grating 906 combined with various steering mirrors, e.g. 908. In this illustrated embodiment, multiple fibre lasers operating at different centre frequency are aimed at a diffraction grating where upon the reflections combine spectrally as different frequencies diffract at different angles. Should any part of an individual output beam be misaligned with an optical component, or the diffraction grating itself heat up, the output beams will misalign and not combine efficiently or at all. The use of the tube scanners 106 in this application can be used to realign the beams (via appropriate actuation signals from controller 122) to correct for thermal effects and other mechanisms that give rise to misalignments. Spectral beam combination such as that illustrated in FIG. 11 is useful for laser systems operating at total output powers of μW to >100 kW power levels.

In other embodiments employing optical sources of different centre frequency, the beam combiner may include other types of dispersive optical element and coupling optics for coupling each of the output optical beams to the dispersive optical element to produce a combined output beam. By way of example, suitable optical elements forming the beam combiner may include one or more of a prism, dichroic mirror, volume Bragg grating and/or multi-layer dielectric grating.

In embodiments where each of the output optical beams have a common centre frequency, the beam combiner may include one or more of a tiled array, polarisation combining element and waveplates, diffractive optical element and/or a beam splitter tree, as well as or in place of conventional mirrors and lenses. Some or all of these elements may also be adopted in embodiments using optical sources of different frequencies.

It will be appreciated that various configurations of optical elements are possible to combine beams from multiple optical sources. In some embodiments, the optical system includes optoelectronic devices which are dynamically controlled by controller 122 to steer beams along different trajectories. Example optoelectronic devices include electrically rotatable mirrors, MEMS mirrors, dynamic polarization elements, liquid crystal phase modulation devices, acousto-optical devices etc.

Controller 122 is configured to simultaneously control the actuators of each system 100 within broader system 900 and to also control any active elements in the optical system 612. Although controller 122 is illustrated as a single element, it will be appreciated that the functions of controller 122 may be separated into different control elements or modules that may communicate with each other to control the various elements of systems 100 and 900.

System 900 may also be used in conjunction with a conventional feedback system which provides a signal to controller 122. By way of example, a conventional feedback system using reflections from objects in the propagation path may be used to determine the trajectories of the beams and adjust the actuators of systems 100 accordingly.

Conclusions

It will be appreciated that the above described fibre positioning system, fibre laser and fibre laser system are capable of quickly and accurately controlling the position of one or more optical fibre tips to direct optical beams in a controlled manner. The invention described herein provides an improved system for directing optical beams in a controlled manner with high tolerance which can be monitored in software. Embodiments of the invention may have the following advantages:

The beam can be accurately steered with very fine precision to within 2-3 standard stepper motor steps.

The system can be made compact and lightweight compared to existing systems.

Beam pointing is deterministic with negligible hysteresis due to the high correlation between tube scanner movement and fibre tip movement.

The system enables very fine pointing and steering of the laser output compared to existing systems.

The system can be operated within a kHz bandwidth to compensate for any system vibrations and associated misalignments, thermally induced misalignments, thermal focussing or atmospheric effects, mechanical misalignments in the larger optical system and mechanical misalignment due to assembly.

At such high bandwidth, the system is able to be operated in a vibration-intense and dynamic environment such as a moving vehicle.

Interpretation

The term "optical" is used throughout the description and specification in the context of an optical signal. Within the scope of this specification, optical refers to the spectrum of electromagnetic radiation that is suitable for guiding down an optical fibre. This may include electromagnetic frequencies in the infrared, visible or ultraviolet ranges.

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being !imitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A fibre positioning system for positioning a tip of an optical fibre, the system comprising:
    a piezoelectric tube scanner disposed along an optical axis, the piezoelectric tube scanner having:
        a first end fixedly mounted with respect to a mounting structure;
        a hollow interior to receive a length of the optical fibre; and
        a second end to bend in a lateral direction perpendicular to the optical axis in response to one or more first actuation signals from a controller; and
    a glass end cap fixedly mounted at the second end of the piezoelectric tube scanner to be optically spliced to the tip of the optical fibre such that bending of the piezoelectric tube scanner results in lateral movement of the tip of the optical fibre with respect to the optical axis; and
    a linear actuator to linearly move the piezoelectric tube scanner and the length of optical fibre in a direction along the optical axis in response to one or more second actuation signals from the controller;
wherein the optical fibre and the length of the optical fibre form part of an optical source, and
    the piezoelectric tube scanner is bendable such that a lateral range of motion of the tip of the optical fibre is greater than a mode field diameter of an output beam produced by the optical source, the mode field diameter is measured at an output of the optical source.

2. The fibre positioning system according to claim 1 wherein the linear actuator includes a displacement amplifier.

3. The fibre positioning system according to claim 2 wherein one side of the displacement amplifier engages the first end of the piezoelectric tube scanner or mounting structure and an opposing side of the displacement amplifier is to engage a rigid surface of a separate structure.

4. The fibre positioning system according to claim 1 wherein the glass end cap is mounted to a fitting which is fixedly mounted within the piezoelectric tube scanner at the second end.

5. The fibre positioning system according to claim 1 wherein the piezoelectric tube scanner is to maintain the length of the optical fibre at a position such that the optical fibre does not contact an inner surface of the tube scanner during operation.

6. The fibre positioning system according to claim 1 wherein the end cap is substantially in line with the second end of the piezoelectric tube scanner along the optical axis.

7. The fibre positioning system according to claim 1 wherein a spatial step resolution of the fibre positioning in the lateral dimension is less than 1 micrometre.

8. The fibre positioning system according to claim 1 wherein the lateral range of motion of the tip of the optical fibre is greater than 100 micrometres.

9. The fibre positioning system according to claim 1 wherein the piezoelectric tube scanner is responsive to the one or more first actuation signals from the controller to laterally displace the fibre tip at a frequency greater than 100 Hz.

10. A positioning system including a plurality of fibre positioning systems according to claim 1, wherein the plurality of fibre positioning systems are disposed in a predefined two-dimensional or three dimensional array.

11. A fibre positioning system for positioning a tip of an optical fibre, the system comprising:
    a piezoelectric tube scanner disposed along an optical axis, the piezoelectric tube scanner having:
        a first end fixedly mounted with respect to a mounting structure;
        a hollow interior to receive a length of the optical fibre; and
        a second end to bend in a lateral direction perpendicular to the optical axis in response to one or more first actuation signals from a controller; and
    a glass end cap fixedly mounted at the second end of the piezoelectric tube scanner to be optically spliced to the tip of the optical fibre such that bending of the piezoelectric tube scanner results in lateral movement of the tip of the optical fibre with respect to the optical axis,
    wherein the length of optical fibre supports the propagation of optical energy to produce a laser output from a tip of the length of optical fibre; and
    the system further comprises:
    an optical system to receive the laser output and to generate an output optical beam along a predetermined trajectory, the piezoelectric tube scanner to position the tip of the optical fibre in at least two dimensions to direct the laser output; and
    a plurality of optical fibres and fibre positioning systems, wherein each optical fibre system is to produce a respective output optical beam; and
    a beam combiner to combine the output optical beams into a combined output beam.

12. The fibre positioning system according to claim 11 wherein the optical system includes an optical power element to at least one of focus or collimate the output optical beam.

13. The fibre positioning system according to claim 11 wherein the system is to support optical radiation having an optical power of at least 100 W.

14. The fibre positioning system according to claim 2 11 wherein the beam combiner includes a dispersive optical element and coupling optics to couple each of the output optical beams to the diffractive optical element to produce a combined output beam.

* * * * *